United States Patent [19]

Talbot

[11] Patent Number: 5,147,676
[45] Date of Patent: Sep. 15, 1992

[54] BLENDS OF NON-LAURIC COATING FATS AND LIQUID, TRANS-HARDENED HIGH STABILITY OILS WITH HIGH RANCIMAT INDUCTION PERIOD VALUES AND COATINGS AND FOOD PRODUCTS OBTAINED THEREFROM

[75] Inventor: Geoffrey Talbot, Kempston, Great Britain

[73] Assignee: Unilever Patent Holdings B.V., Rotterdam, Netherlands

[21] Appl. No.: 714,897

[22] Filed: Jun. 14, 1991

[30] Foreign Application Priority Data

Jun. 14, 1990 [EP] European Pat. Off. ........ 90306472.3

[51] Int. Cl.$^5$ .............................................. A23D 9/02
[52] U.S. Cl. .................................... 426/601; 426/417; 426/607; 426/660
[58] Field of Search ............... 426/601, 607, 417, 660; 260/428, 428.5

[56] References Cited

U.S. PATENT DOCUMENTS 3,856,831 12/1977 Tateishi et al. .
4,061,798 12/1977 Kanegae et al. .................... 426/607

FOREIGN PATENT DOCUMENTS 867615 5/1961 United Kingdom .
1219245 1/1971 United Kingdom .

OTHER PUBLICATIONS

Patent Abstracts of Japan, vol. 9, 134 (C-285) 1857, Jun. 8, 1985.
Patent Abstracts of Japan, vol. 8, No. 34, Abstract No. JP-A-58 198 252 (1984).

Primary Examiner—Joseph Golian
Assistant Examiner—Evan Federman
Attorney, Agent, or Firm—Cushman, Darby & Cushman

[57] ABSTRACT

Blends of mid-fractions and olein fractions of the wet-fractionation of hardened soybean oil and optionally hardened palm oil olein and/or hardened cottonseed oil containing fat mixtures show improved Rancimat Induction Period (RIP) values.

15 Claims, No Drawings

BLENDS OF NON-LAURIC COATING FATS AND LIQUID, TRANS-HARDENED HIGH STABILITY OILS WITH HIGH RANCIMAT INDUCTION PERIOD VALUES AND COATINGS AND FOOD PRODUCTS OBTAINED THEREFROM

BACKGROUND OF THE INVENTION

So far, a number of non-temper, non-lauric coating fats are known that contain mid-fractions of the wet fractionation of fat mixtures containing hardened soybean oil. These coating fats have a reasonable oxidation stability, measured as Rancimat Induction Period. This measurement is disclosed in an article by Woestenburg and Zaalberg in Fette, Seifen, Anstrichmittel, 80. (2), 1986, pp. 53–56. A value of at least 30 hours at 120° C. is known for such compositions. However, it is highly desirable to obtain coating fats with a much longer Rancimat Induction Period (RIP).

SUMMARY OF THE INVENTION

We have succeeded in obtaining blends which meet the above-mentioned requirement. Therefore, our invention is concerned with fat blends of non-lauric coating fats (=I) and liquid, trans-hardened, high-stability oils (=II), wherein the weight ratio of I:II ranges from 95:5 to 70:30, preferably from 90:10 to 80:20.

DESCRIPTION OF PREFERRED EMBODIMENT

The non-lauric coating fats (I) in these blends are mid-fractions that can be obtained from the wet fractionation of fat mixtures containing hardened soybean oil. These last-mentioned fat mixtures preferably contain palm oil olein and/or cottonseed oil as the other fat component(s), which were hardened together with the soybean oil.

The liquid, trans-hardened, high-stability oils (II) in the blends according to the invention are olein fractions that can be obtained from the wet fractionation of fat mixtures containing hardened soybean oil. These last-mentioned fat mixtures preferably contain palm oil olein and/or cottonseed oil as the other fat component(s), which were hardened with the soybean oil.

The ratio of the fat component(s) in the mixtures containing soybean oil can vary between 90:10 and 10:90, preferably between 70:30 and 30:70, soybean oil:other fat. We prefer, however, to use mixtures having more than 50% of the other fat component, which is preferably palm oil olein or cottonseed oil.

As will be understood from the above, the blends can consist of the fat components (I) and (II) that originate from the same or from a different wet fractionation of mixtures containing hardened soybean oil. Therefore, the invention also comprises blends which e.g. contain components of bean oil and palm oil components originating from I and cottonseed oil originating from II or components of bean oil and cottonseed oil from I and palm oil from II. However, the best blends are obtained when part of the olein fraction is mixed with the mid-fraction of the same wet fractionation.

The liquid, trans-hardened, high-stability oils that are used in the invention have RIP values of more than 50 hours at 120° C. However, it is surprising that by mixing a small amount (5–30 wt.%) of these oils with the non-lauric fats I, RIP values for the mixtures could be obtained that are close to the RIP value of the oils II (cf. Examples).

It seems that some sort of unexpected synergism exists for the RIP value by mixing fats I and II.

The invention is also concerned with chocolate coatings having an improved oxidation stability which contain the fat blend according to the invention. Also food products that contain such chocolate coatings are part of the invention.

Another part of the invention is the use of fat blends containing non-lauric coating fats and liquid, transhardened high-stability oils in order to improve the oxidation stability of chocolate coatings.

The blends according to the invention can be prepared in several ways. The most efficient way is a catalytic hardening of soybean oil, which optionally contains wet-fractionated palm oil olein and/or cottonseed oil, followed by wet fractionation of the hardened product. In this wet fractionation three fractions are obtained:

1) a hard stearin fraction;
2) a mid-fraction (=I);
3) an olein fraction (=II).

Mid-fraction I is then blended with either the olein fraction II obtained, or with another olein fraction obtained in a separate wet fractionation process. However, changes in the order of the reaction steps are possible within the process described. However, this is to be considered to be within the scope of our invention.

The hardening of the fat mixtures containing soybean oil is carried out in a way such that the highest amount of trans-hardened oil is obtained. For this purpose a sulphided Ni-catalyst is very suitable.

The wet fractionation is carried out in the normal way, using acetone as solvent in a ratio of more than 3 volume units acetone per weight unit of oil (so e.g. liters per kg). The components are mixed at T above 35° C., cooled to −15° to +15° C. and separated, whereby a solid fraction is obtained. This solid fraction is dissolved in acetone, again at T above 35° C., whereupon the mixture is cooled to 16–24° C. The acetone fraction, which is separated, is worked up in order to collect the mid-fraction.

EXAMPLES

The following mixtures were made and from these mixtures the RIP value at 120° C. was measured.

| | Mid-fraction of hydrogenated mixture of soybean oil/wet-fract. palm oil olein | Olein fraction of hydrogenated mixture of soybean oil/wet-fract. palm oil olein | RIP |
|---|---|---|---|
| I | 100 | — | 16.4 |
| | 90 | 10 | 44.4 |
| | 80 | 20 | 53.9 |
| | 70 | 30 | 55.9 |
| | — | 100 | 59.8 |
| | Mid-fraction of hydrogenated mixture of soybean oil/wet-fract. palm oil olein | Olein fraction of hydrogenated mixture of soybean oil and cottonseed oil | RIP |
| II | 100 | — | 16.4 |
| | 90 | 10 | 39.7 |
| | 80 | 20 | 43.7 |
| | 70 | 30 | 51.2 |
| | — | 100 | 50.7 |

I claim:
1. A blend of

(I) non-lauric coating fats comprising a mid-fraction of the wet fractionation of fat mixtures containing hardened soybean oil and (II) liquid, trans-hardened high-stability oils comprising the olein-fraction of the wet fractionation of mixtures containing soybean oil, wherein the weight ratio of I:II ranges from 90:10 to 70:30 and wherein the Rancimat Induction Period value of the blend is more than calculated from the Rancimat Induction Period values of the individual components of the blend.

2. A blend according to claim 1, wherein the mixture containing hardened soybean oil also comprises at least one member from the group consisting of hardened, wet-fractionated palm oil olein and hardened cottonseed oil.

3. A blend according to claim 2, wherein the mixture containing hardened soybean oil comprises at least one member from the group consisting of hardened, wet-fractionated palm oil olein and hardened cottonseed oil in an amount such that the weight ratio of hardened soybean oil: said member is 90:10 to 10:90.

4. A blend according to claim 1, wherein the liquid, trans-hardened, high-stability oils (II) are olein fractions of the wet fractionation of mixtures containing hardened soybean oil.

5. A blend according to claim 4, wherein the mixtures containing hardened soybean oil also comprise a member of the group consisting of hardened, wet-fractionated palm oil olein and hardened cottonseed oil.

6. A blend according to claim 1 wherein the components (I) and (II) originate from the same wet fractionation of mixtures containing hardened soybean oil.

7. A blend according to claim 1 wherein the components (I) and (II) originate from a different wet fractionation of mixtures containing hardened soybean oil.

8. A blend according to claim 1 wherein the ratio of I:II ranges from 90:10 to 80:20.

9. A blend according to claim 1 wherein (I) has a relatively low Rancimat Induction Period value and (II) has a Rancimat Induction Period value of more than 50 hours at 120° C.

10. A blend according to claim 1 wherein the ratio of I:II is 80:20–70:30.

11. Process for the preparation of a blend of non-lauric coating fats and liquid, trans-hardened, high-stability oil, wherein soybean oil or soybean oil mixed with a least one member of the group consisting of wet-fractionated palm oil olein and cottonseed oil, is hardened catalytically, whereupon the hardened product is wet-fractionated and separated into a hard stearin fraction, a mid-fraction and an olein fraction after which the mid-fraction as non-lauric coating fat is blended with part of an olein fraction from the same or a different wet fractionation.

12. Process according to claim 11, wherein the hardening is carried out with a sulphided Ni-catalyst.

13. Process according to claim 12, wherein the wet fractionation is carried out with acetone in a ratio of more than 3 volume units acetone per weight unit of oil.

14. Chocolate coatings having an improved oxidation stability, which contain a fat blend according to claim 1.

15. Food products containing a chocolate coating according to claim 14.

* * * * *